US009509408B2

(12) United States Patent
Simonneau et al.

(10) Patent No.: US 9,509,408 B2
(45) Date of Patent: Nov. 29, 2016

(54) OPTICAL DATA TRANSMISSION SYSTEM

(71) Applicant: Alcatel Lucent, Boulogne Billancourt (FR)

(72) Inventors: Christian Simonneau, Nozay (FR); Yvan Pointurier, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/394,424

(22) PCT Filed: Apr. 24, 2013

(86) PCT No.: PCT/EP2013/058425
§ 371 (c)(1),
(2) Date: Oct. 14, 2014

(87) PCT Pub. No.: WO2013/171042
PCT Pub. Date: Nov. 21, 2013

(65) Prior Publication Data
US 2015/0063807 A1    Mar. 5, 2015

(30) Foreign Application Priority Data

May 16, 2012  (EP) .................................... 12305545

(51) Int. Cl.
*H04J 14/00* (2006.01)
*H04L 12/28* (2006.01)
(Continued)

(52) U.S. Cl.
CPC ............ *H04B 10/275* (2013.01); *H04B 10/25* (2013.01); *H04B 10/2581* (2013.01);
(Continued)

(58) Field of Classification Search
CPC . H04B 10/275; H04B 10/25; H04J 14/0272; H04J 14/0283; H04J 14/0284

USPC .............................................. 398/59, 56, 51
See application file for complete search history.

(56) References Cited

U.S. PATENT DOCUMENTS 5,406,549 A * 4/1995 Kremer ................... H04J 3/085
370/224
6,333,799 B1 * 12/2001 Bala ..................... H04J 14/0212
398/9

(Continued)

FOREIGN PATENT DOCUMENTS

JP    2002510159    4/2002
JP    2008545347    12/2008

(Continued)

OTHER PUBLICATIONS

Amin Vahdat, et al; The Emerging Optical Data Center; Optical Fiber Communication Conference, 2011; Technical Digest; OFC/NFOEC, IEEE, Mar. 6, 2011; pp. 1-3; XP031946523; ISBN: 978-1-4577-0213-6.

(Continued)

*Primary Examiner* — Oommen Jacob
(74) *Attorney, Agent, or Firm* — Patti & Malvone Law Group, LLC

(57) ABSTRACT

A data transmission system (200) comprises: a main optical packet ring (201) comprising a plurality of separate packet transmission channels; and a plurality of secondary optical packet rings (202) interconnected through the main optical packet ring. Each of the secondary optical packet rings (202) comprises a plurality of nodes (400). Each of said packet transmission channels of the main optical packet ring (201) is connected to a different node of each secondary optical packet ring (202), respectively.

12 Claims, 10 Drawing Sheets

(51) Int. Cl.
| | |
|---|---|
| H04J 14/02 | (2006.01) |
| H04B 10/275 | (2013.01) |
| H04B 10/2581 | (2013.01) |
| H04Q 11/00 | (2006.01) |
| H04B 10/25 | (2013.01) |
| H04L 7/00 | (2006.01) |

(52) U.S. Cl.
CPC ...... *H04J 14/0272* (2013.01); *H04J 14/0283* (2013.01); *H04J 14/0284* (2013.01); *H04J 14/0286* (2013.01); *H04L 7/0075* (2013.01); *H04Q 11/0062* (2013.01); *H04Q 11/0066* (2013.01); *H04J 14/0212* (2013.01); *H04Q 2011/0092* (2013.01); *H04Q 2011/0098* (2013.01)

(56) References Cited

U.S. PATENT DOCUMENTS

| | | | | |
|---|---|---|---|---|
| 6,647,014 | B1* | 11/2003 | Shimada | H04L 41/00 370/276 |
| 6,879,783 | B1* | 4/2005 | Nakahira | H04Q 11/0005 398/49 |
| 7,421,197 | B2* | 9/2008 | Palacharla | H04J 14/0227 398/5 |
| 2002/0131101 | A1* | 9/2002 | Ohira | H04B 10/0773 398/9 |
| 2008/0273875 | A1* | 11/2008 | Sone | H04J 14/0217 398/58 |
| 2014/0198812 | A1* | 7/2014 | Olsson | H04J 14/0202 370/542 |
| 2015/0063807 | A1* | 3/2015 | Simonneau | H04B 10/25 398/59 |

FOREIGN PATENT DOCUMENTS

| | | |
|---|---|---|
| KR | 10-2005-0103556 | 11/2005 |
| WO | 97/05725 | 2/1997 |
| WO | 98/09403 | 3/1998 |
| WO | 2007096852 | 8/2007 |

OTHER PUBLICATIONS

Limei Peng, et al; A Novel Approach to Optical Switching for Intradatacenter Networking; Journal of Lightwave Technology, IEEE Service Center, New York, NY; US; vol. 30, No. 2; Jan. 1, 2012; pp. 252-266; XP011398572; ISSN: 0733-8724; DOI: 10.1109/JLT.2011.2180888.

Marc A. Taubenblatt; Optical Interconnects for High-Performance Computing; Journal of Lightwave Technology, IEEE Service Center; New York, NY; US; vol. 30, No. 2; Feb. 1, 2012; pp. 448-457; XP011395647; ISSN: 0733-8724; DOI: 10.1109/JLT.2011.2172989.

Marsan, A. et al; A Comparison of Regular Topologies for All-Optical Networks; Networking: Foundation for the Future; San Francisco, Mar. 28-Apr. 1, 1993; [Proceedings of the Annual Joint Conference of the Computer and Communications Societies (Infocom)]; Los Alamitos, IEEE Comp. Soc. Press, US; vol. CONF. 12; Mar. 28, 1993; pp. 36-47; XP010032223; DOI: 10.1109/INFCOM.1993.253251; ISBN: 978-0-8186-3580-9.

Marsan, A. et al; All-Optical Bidirectional Manhattan Networks; Discovering a New World of Communications, Chicago, Jun. 14-18, 1992; [Proceedings of the International Conference on Communications]; New York, IEEE, US; Jun. 14, 1992; pp. 1461-1467; XP010061898; DOI: 10.1109/ICC.1992.267999; ISBN: 978-0-7803-0599-1.

Banerjee, D. et al; The Multidimensional Torus: Analysis of Average Hop Distance and Application as a Multihop Lightwave Network; Serving Humanity Through Communications; SUPERCOM/ICC; New Orleans; May 1-5, 1994; [International Conference on Communication (ICC)]; New York, IEEE, US; May 1, 1994; pp. 1675-1680; XP000438778.

Chiaroni, D. et al; Packet OADMS for the next generation of ring networks; Bell Labs Technical Journal, U.S., 2010, vol. 14, Issue. 4, pp. 265-283; DOI: 10.1002/bltj.20415.

Chiaroni, D.; New generation metro networks: Challenges and opportunities; 2010 36th European Conference and Exhibition on Optical Communication (ECOC), France, IEEE, Sep. 19, 2010, pp. 1-12.

Chiaroni, D. et al; Optical Packet Add/Drop Systems; 2010 Conference on Optical Fiber Communication (OFC), aollocated National Fiber Optic Engineers Conference (OFC/NFOEC), U.S., IEEE, Mar. 21, 2010, pp. 1-3.

* cited by examiner

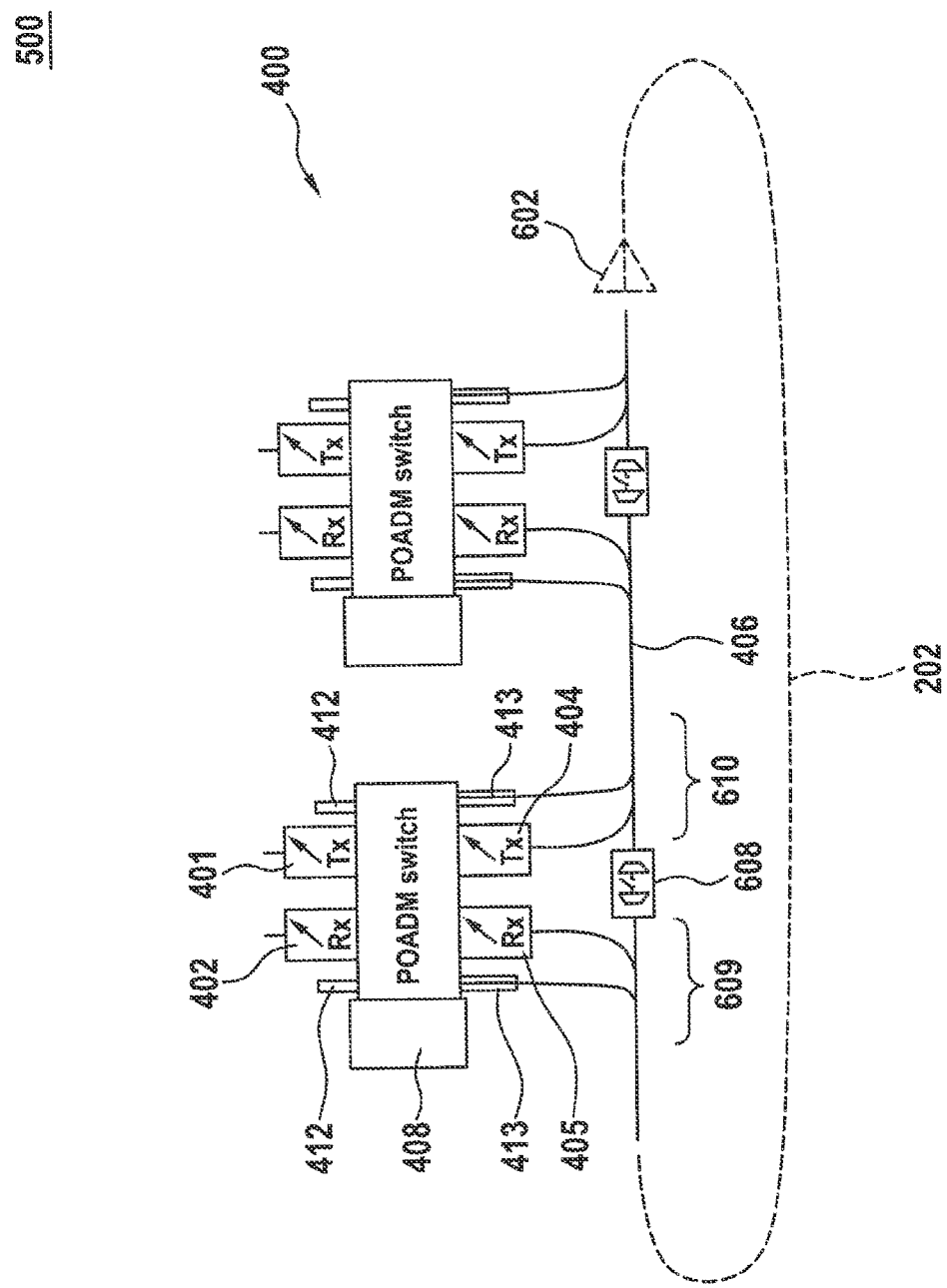

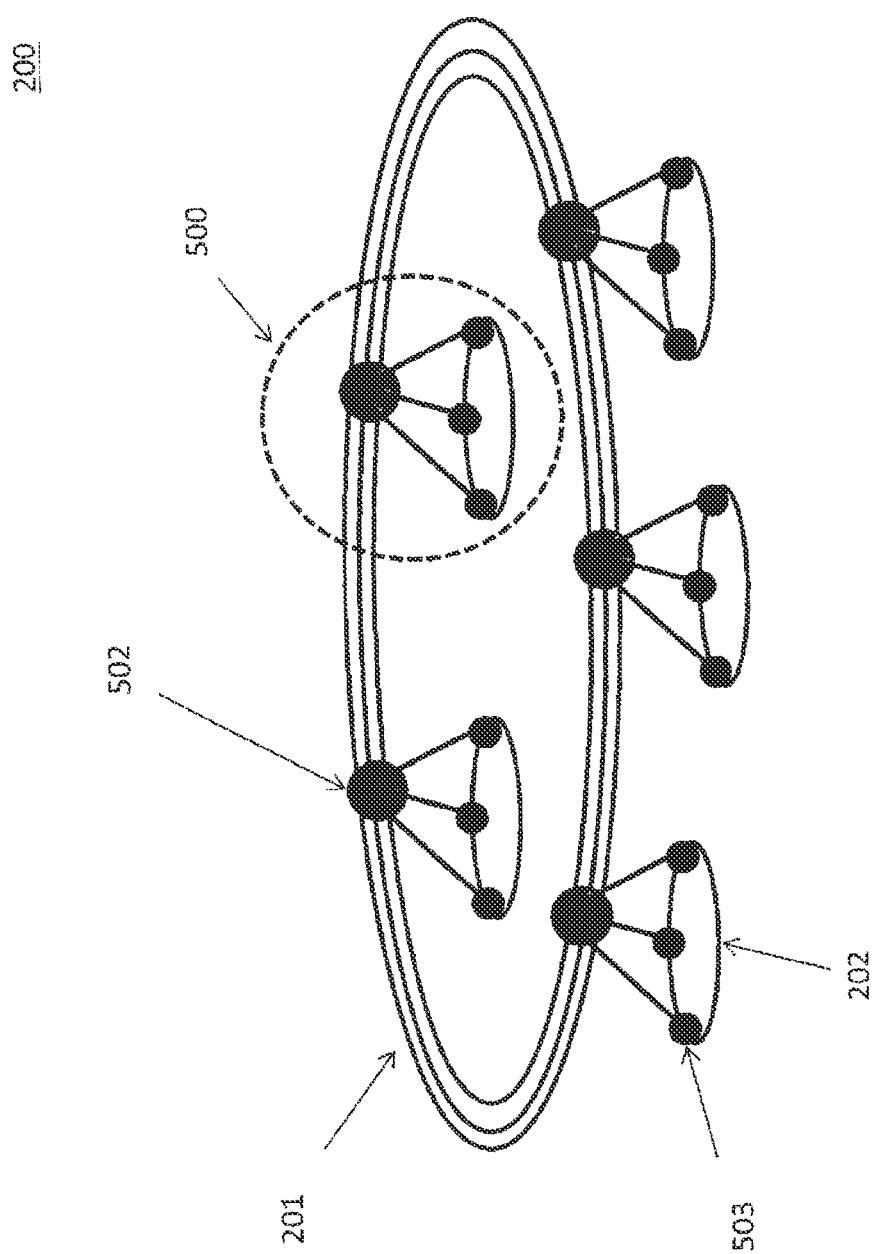

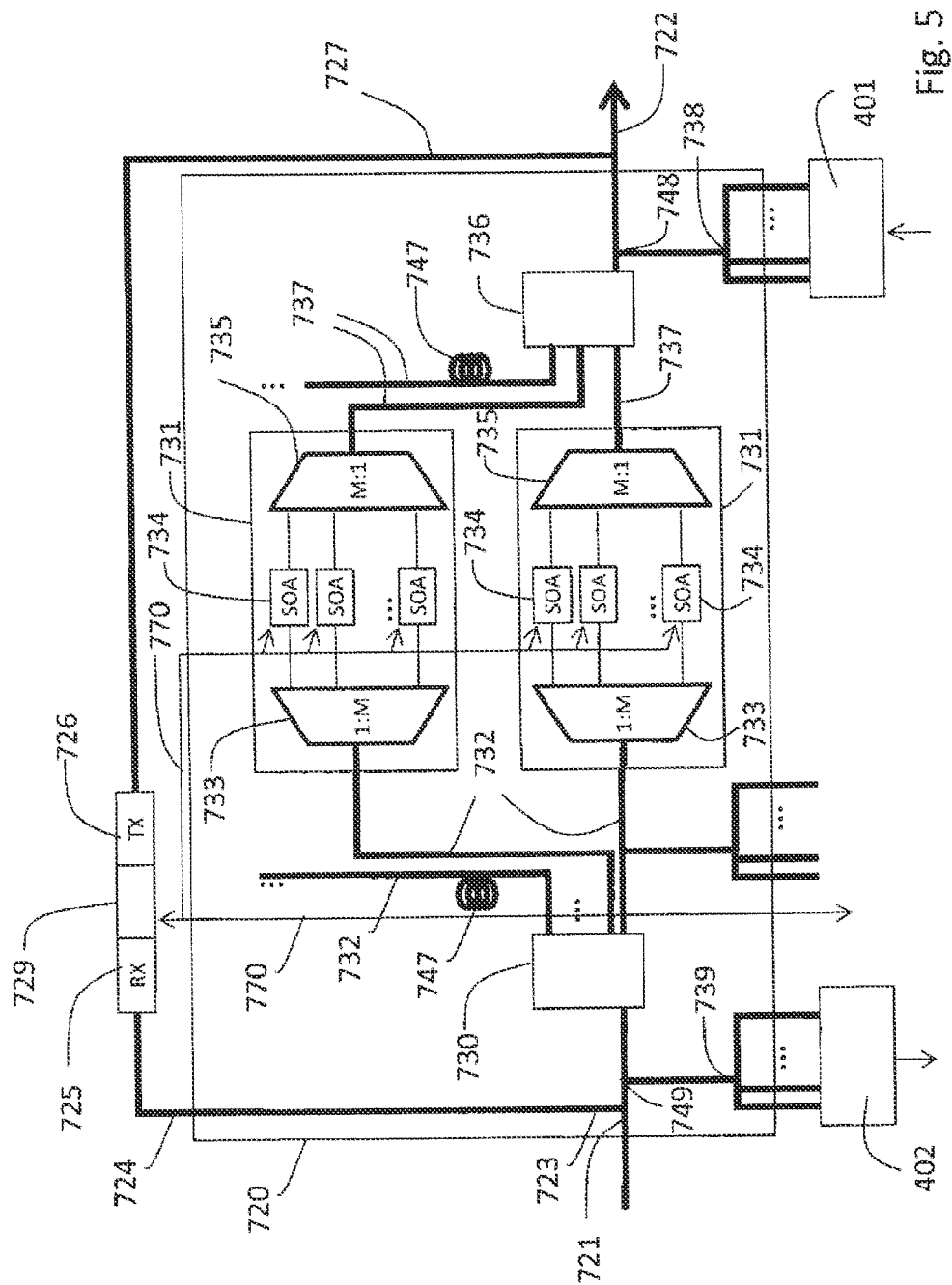

OPTICAL DATA TRANSMISSION SYSTEM

FIELD OF THE INVENTION

The invention relates to the technical field of optical packet switching in optical communication systems. The invention further relates to network nodes and data transmission systems for storing/providing data in data centers using optical packet switching, and respective methods.

BACKGROUND

In recent years, the use of data centers has become more and more popular. One of the problems of conventional data centers is that, due to the large number of components of a data center, a large number of data connections between the components are necessary. Conventional network architectures for data centers generally use Ethernet switches connected via Ethernet cables as data connections. This results in a complicated network structure, as will be explained in the following.

FIG. 1 shows an example of a conventional network architecture 100 of a data center having three layers (only layers 2 and 3 are shown). As can be derived from FIG. 1, in network layer 2, a plurality of Top of Rack (ToR) switches are connected to a plurality of switches S. The switches S are connected to aggregation switches AS. The aggregation switches AS are connected to access routers AR located in layer 3. The access routers AR are then connected to core routers CR located in layer 3. The core routers CR are connected to an external communication network like the Internet.

In this architecture, as data flows through the data center network up the switch hierarchy (from the Top of Rack switches towards the Internet), data bottlenecks may occur resulting in high latency effects. It is possible to remove the data bottlenecks in the network by adding more hardware to the data center, i.e. at the expense of increasing the hardware costs of the datacenter ("overprovisioning"). The amount of overprovisioning can be specified by an "oversubscription ratio" which essentially indicates how much hardware capacity is provisioned versus the maximum data traffic demand/hardware resource demand in the data center network.

The architecture 100 shown in FIG. 1 requires a large number of interfaces and cables in order to connect the components of the data center with each other. In addition, the cables often cross each other. This causes high costs and efforts for maintaining the data center.

SUMMARY

In an embodiment, a data transmission system is provided. The data transmission system comprises a main optical packet ring having a plurality of packet transmission channels and a plurality of secondary optical packet rings interconnected through the main optical packet ring. Each of the secondary optical packet rings comprises a plurality of nodes. Each of the packet transmission channels of the main optical packet ring is connected to a different node of each secondary optical packet ring, respectively. Thus, each node is connected with a packet transmission channel of the main optical packet ring and a secondary optical packet ring. The nodes connected to a secondary optical packet ring are typically connected to different packet transmission channels of the main optical packet ring. In an embodiment, each node may be connected to one packet transmission channel of the main optical packet ring and one secondary optical packet ring. Thus, a fully interconnected network architecture is provided where all nodes are connected without any bottlenecks.

In an embodiment, each node may comprise a data interface connectable to at least one data processing unit, e.g. a server computer in a data center. Each data interface may be selectively connectable to the main optical packet ring and to the secondary optical packet ring of the node. The nodes may be configured such that an optical data packet propagating on a packet transmission channel of the main optical packet ring and being addressed to a data interface of a destination node that is not connected to the packet transmission channel carrying the data packet, is received by a node that is connected to the packet transmission channel carrying the data packet. The packet may then be forwarded via a secondary optical packet ring to the destination node. Alternatively or in addition, the nodes may be configured to forward an optical data packet from a source node via a secondary optical packet ring to another node that is also connected to the secondary optical packet ring, and to transmit the optical data packet, via the packet transmission channel of the main optical packet ring connected to the another node, to a destination node. Hence, each node can communicate with each node via one data transfer on a secondary optical packet ring and one data transfer on the main optical packet ring.

Thus, full connectivity among all nodes and data processing units of the network is achieved. The network traffic between nodes is carried by the plurality of optical packet transmission channels of the main optical packet ring. The plurality of secondary packet rings, each assigned to a particular set of nodes, allows channel changeovers, e.g. in the secondary packet ring of the source node, in the secondary packet ring of the destination node, or in any secondary packet ring of an intermediate node of the main optical packet ring.

In an embodiment, each packet transmission channel of the main optical packet ring may be a separate physical channel and use a separate optical signal. The packet transmission channels may be multiplexed transmission channels. In an embodiment, the main optical packet ring comprise at least one of: spatially multiplexed mode channels within a multi mode optical fiber to allow simultaneous propagation of signals is different optical modes; fiber cores of a multi core optical fiber, each core allowing propagation of at least one optical signal; wavelength channels within an optical fiber allowing simultaneous propagation of signals of different wavelengths; and optical fibers within a multi fiber cable, each optical fiber allowing propagation of at least one optical signal. In other words, the main optical packet ring may comprise a multi mode optical fiber allowing simultaneous propagation of signals of different optical modes, or may comprise a multi core optical fiber, each core allowing propagation of at least one optical signal. Alternatively, the main optical packet ring may comprise a multi fiber cable comprising a bundle of optical fibers, each optical fiber allowing propagation of at least one optical signal. Further, the main optical packet ring may comprise a multi wavelength optical fiber allowing simultaneous propagation of signals of different wavelengths.

In an embodiment, the main optical packet ring may comprises at least one demultiplexer adapted to separate or demultiplex the packet transmission channels of the main optical packet ring, and at least one multiplexer adapted to combine or multiplex the packet transmission channels onto the main optical packet ring. The data transmission system may comprise a plurality of first optical fibers. Each first optical fiber may carry one packet transmission channel of the main optical packet ring. The first optical fibers are typically placed between a demultiplexer and a multiplexer and carry the optical packets of the main optical packet ring separated into the individual packet transmission channels. A plurality of amplifiers may be placed into the first optical fibers. The amplifiers respectively amplify a signal corresponding to a packet transmission channel of the main optical packet ring and propagating on a first optical fiber. Alternatively, a common amplifier may be placed into the main optical packet ring to jointly amplify all packet transmission channels of the main optical packet ring. The amplifiers may for example be multi mode amplifiers for multi mode fibers, multi core amplifiers for multi core fibers, mono mode amplifiers for fiber bundles and also for multi core/mode fibers (in this case the amplifiers may be located after the demultiplexing means).

In an embodiment, each node may comprises a first transmitter unit and a first receiver unit respectively connected to a packet transmission channel of the main optical packet ring. The first transmitter unit and the first receiver unit may be connected to a first optical fiber associated with the main optical packet ring. The node may further comprise a second transmitter unit and a second receiver unit respectively connected to a secondary optical packet ring. The second transmitter unit and the second receiver unit may be connected to a second optical fiber associated with the secondary optical packet ring. The node may further comprise a data interface connectable to a data processing unit, and a switching unit connected to the first transmitter unit, the first receiver unit, the second transmitter unit, the second receiver unit, and the data interface. The switching unit may be configured to selectively establish connection paths between the first receiver unit or the second receiver unit and the first transmitter unit or the second transmitter unit, or between one of the first receiver unit, the second receiver unit, the first transmitter unit, or the second transmitter unit and the data interface. High network performance and full connectivity between data processing units can be achieved with this embodiment while the number of connections between the components is significantly reduced. Thus, an efficient data transmission system for a large scale data center can be provided.

In an embodiment, the main optical packet ring and the secondary optical packet rings are transparent. Transfer from the main optical packet ring and the secondary optical packet ring is via optoelectronic conversions. For example, the first and/or second transmitter unit(s) may be fast wavelength tunable transmitter(s) which emit(s) packets, and potentially change(s) wavelength for each packet. Similarly, the first and/or second receiver unit(s) may be fast wavelength tunable receiver unit(s) which receive(s) packets, and potentially change(s) wavelength for each packet.

In an embodiment, each node may comprise a first optical packet control interface connectable to a first optical packet blocker coupled with the main optical packet ring. The node may be configured to forward first blocking information through the first optical packet control interface to the first optical packet blocker. The first blocking information indicates whether optical packets traveling on the main optical packet ring are to be blocked or passed through by the first optical packet blocker.

In an embodiment, each node may comprise a second optical packet control interface connectable to a second optical packet blocker coupled with the secondary optical packet ring of the node. The node may be configured to forward second blocking information through the second optical packet control interface to the second optical packet blocker. The second blocking information indicates whether optical packets traveling on the secondary optical packet ring are to be blocked or passed through by the second optical packet blocker.

The optical packet blockers may be e.g. integrated packet blockers that control packet traffic on the respective optical packet ring, i.e. let optical packets transit or clear a packet time slot in order to drop or replace a packet. For example, silicon integrated photonics packet blockers may be used. Such packet blockers may comprise a wavelength de-multiplexer, optical gates, and a multiplexer. The blocking function could be implemented using individual components (the optical gate could be a SOA (Semiconductor Optical Amplifier) or a R-SOA (Reflective SOA) or any 1:1 fast optical switch). This blocking function could be also implemented using other technologies: for instance, III-V semiconductor technology, silicon photonics technology, or hybrid III-V semiconductor on silicon photonics, or any other technology (like planar silica).

In an embodiment, the switching unit may comprise a first control information interface connectable to the main optical packet ring. The switching unit may be configured to receive/send control information via the first control information interface from/to the main optical packet ring. The switching unit may further comprise a second control information interface connectable to the secondary optical packet ring of the node. The switching unit may be configured to receive/send control information via the second control information interface from/to the secondary optical packet ring.

In an embodiment, the switching unit may be configured to selectively establish connection paths between the first receiver unit or the second receiver unit and the first transmitter unit or the second transmitter unit, or between one of the first receiver unit, the second receiver unit, the first transmitter unit, or the second transmitter unit and the data interface based on control information received via the first control information interface or via the second control information interface. This allows that the switching unit may be efficiently controlled.

In an embodiment, the first blocking information and the second blocking information to control the first optical packet blocker and the second optical packet blocker may be generated based on control information received via the first control information interface or via the second control information interface. Thus, the operation of the packet blockers can be efficiently controlled.

In an embodiment, the secondary optical packet rings may be single mode/single core fiber rings. A plurality of amplifiers may be placed into a secondary optical packet ring. The amplifiers respectively amplify a signal propagating through the secondary optical packet ring. Typically, the number of amplifiers is lower than the number of nodes (or data processing units) connected to the secondary optical packet ring. For example, only every n nodes an amplifier is arranged in (placed into) the optical packet ring. This is possible because typically the distances between the (receivers and transmitters of the) nodes is small so that the fiber losses are small. Also, due to small chromatic dispersion, a receiver unit may be used which needs lower digital signal processing capabilities (than conventional coherent receivers used in long haul transmission systems), and which has a low power consumption. One effect of this embodiment is that the hardware effort can be further reduced.

In an embodiment, the nodes connected to a secondary optical packet ring may have a common control unit coupled with the main optical packet ring. The common control unit may be configured to selectively control first optical packet blockers coupled with the main optical packet ring. The first optical packet blockers may be used to selectively block or pass through optical packets traveling on the main optical packet ring under control of the common control unit.

In an embodiment, the first transmitter unit and the first receiver unit and/or the second transmitter unit and the second receiver unit may be configured to respectively operate on multiple wavelengths. Thus, the operation of the main packet ring may be based on wavelength division multiplexing (WDM). For example, 80 different wavelengths on each fiber or core or mode may be used to transmit packets on the main optical ring. In embodiments, a particular wavelength of the plurality of wavelengths is assigned to a particular node or data interface (or data processing unit). Thus, a high network performance can be achieved while the number of connections between the nodes and thus between the data interfaces (or data processing units) is still further reduced.

In an embodiment, the data processing units connected to nodes may be server units providing data storage and retrieving functionality. Thus, a very efficient data center can be implemented based on the suggested network architecture.

In an embodiment, the control information may propagate through the main optical packet ring and/or the secondary optical packet rings in synchronization with the corresponding optical data packets. In this way, all nodes on a ring can be synchronized with each other easily, and a synchronous optical network is provided where packets can be transmitted in time slots on the main and/or secondary optical rings. Typically, the synchronization of the main optical packet ring is independent from the synchronization of the secondary optical packet rings.

In an embodiment, the control information may propagate through the main optical packet ring and/or the secondary optical packet rings using a dedicated control channel. In each fiber/core/mode a dedicated wavelength (modulated for instance at 2.5 Gbit/s) may be assigned for the control channel, or alternatively one fiber, mode or core could be dedicated to carry control data for all packets carried on all wavelengths and all cores/modes. In this way, control information can be extracted at all nodes transparently.

In an embodiment, a super node comprising a plurality of nodes is provided. The first transmitter unit and the first receiver unit of a node within the super node may be connected to the same mode of the multi mode optical fiber or to the same core of the multi core optical fiber or the same fiber of a fiber bundle. The first transmitter units of different nodes may be connected to different modes of the multi mode optical fiber or to different cores of the multi core optical fiber, respectively. The first receiver units of different nodes may be connected to different modes of the multi mode optical fiber or to different cores of the multi core optical fiber or the same fiber of a fiber bundle, respectively. An effect of this embodiment is that a very efficient system for a large number of nodes is obtained. The system comprising a plurality of super nodes may provide a very large number of data interface for connecting data processing units, thereby providing an efficient fully-meshed network infrastructure for a large data center.

In an embodiment, the second transmitter unit and the second receiver unit of each node of a super node are connected to a common secondary optical packet ring. Thus, a compact system of a plurality of fully-connected nodes connected by a minimum amount of cables is obtained.

In an embodiment, each super node may comprise an optical (spatial) de-multiplexing means to separate a mode of the multi mode optical fiber (of the main optical packet ring) into a first optical fiber, or to couple a core of the multi core optical fiber (of the main optical packet ring) with a first optical fiber. A super node may further comprise an optical multiplexing means to multiplex a mode onto the multi mode optical fiber (of the main optical packet ring). An optical signal corresponding to the mode may be carried on a first optical fiber. The multiplexing means may also be used to couple a first optical fiber to a core of the multi core optical fiber (of the main optical packet ring). These (de-) multiplexing means allow efficient coupling of an individual node with the multi mode/core fiber of the main optical packet ring. In the case that the main optical packet ring comprises a cable with multiple optical fibers, (de-) multiplexing means are not needed since each optical fiber of the bundle can be connected with an individual first receiver/first transmitter, so no signal superposition is needed.

In an embodiment, a method of interconnecting network nodes in a data transmission system is provided. The method may comprise providing a main optical packet ring comprising a plurality of separate packet transmission channels; providing a plurality of secondary optical packet rings, each of said secondary optical packet rings comprising a plurality of nodes; and interconnecting said plurality of secondary optical packet rings through said main optical packet ring by connecting each of said packet transmission channels of the main optical packet ring to a different node of each secondary optical packet ring, respectively.

As such, the data transmission system may comprise a main optical packet ring comprising a plurality of packet transmission channels; a plurality of secondary optical packet rings; and a plurality of nodes positioned along the main optical packet ring. Each node may be connected with a packet transmission channel of the main optical packet ring and a secondary optical packet ring. A network node may comprise a data interface connectable to one or more data storing/retrieving units. The data interface of a node may be connectable via a first receiver unit or a first transmitter unit to the main optical packet ring. The data interface of a node may also be connectable via a second receiver unit or a second transmitter unit to the secondary optical packet ring.

The method may further comprise transmitting an optical data packet addressed to a destination node on a packet transmission channel of the main optical packet ring to a first node, wherein the destination node is not connected to the packet transmission channel carrying the data packet; and forwarding the received optical data packet from the first node via a secondary optical packet ring to the destination node. The secondary optical packet ring interconnects the first node and the destination node.

The method may comprise transmitting an optical data packet from a source node along a secondary optical packet ring to a second node, the secondary optical packet ring interconnecting the source node and the second node; and forwarding the received optical data packet from the second node to its destination on a packet transmission channel of the main optical packet ring.

It should be noted that the above mentioned aspects for data transmission systems and nodes of the system are applicable for the suggested method as well. Thus, all aspects disclosed for embodiments of the system and nodes can be combined with the suggested method to achieve similar effects and advantages.

These and other aspects of the invention will be apparent from and elucidated with reference to the embodiments described hereinafter, by way of example, with reference to the drawings.

BRIEF DESCRIPTION OF THE DRAWINGS

FIG. 3a schematically illustrates a part of data transmission system according to an embodiment.

FIG. 4a schematically illustrates a data transmission system according to an embodiment.

FIG. 5 schematically illustrates a possible realization of a part of the data transmission system shown in FIG. 3.

While a plurality of embodiments are described below, it is clear to a person skilled in the art that individual features from more than one embodiment may be combined and that the disclosure of the present document extends to every possible combination of features described in conjunction with the embodiments. In particular, features disclosed in combination with an example method may also be combined with embodiments relating to an example system and vice versa.

Figure 1:
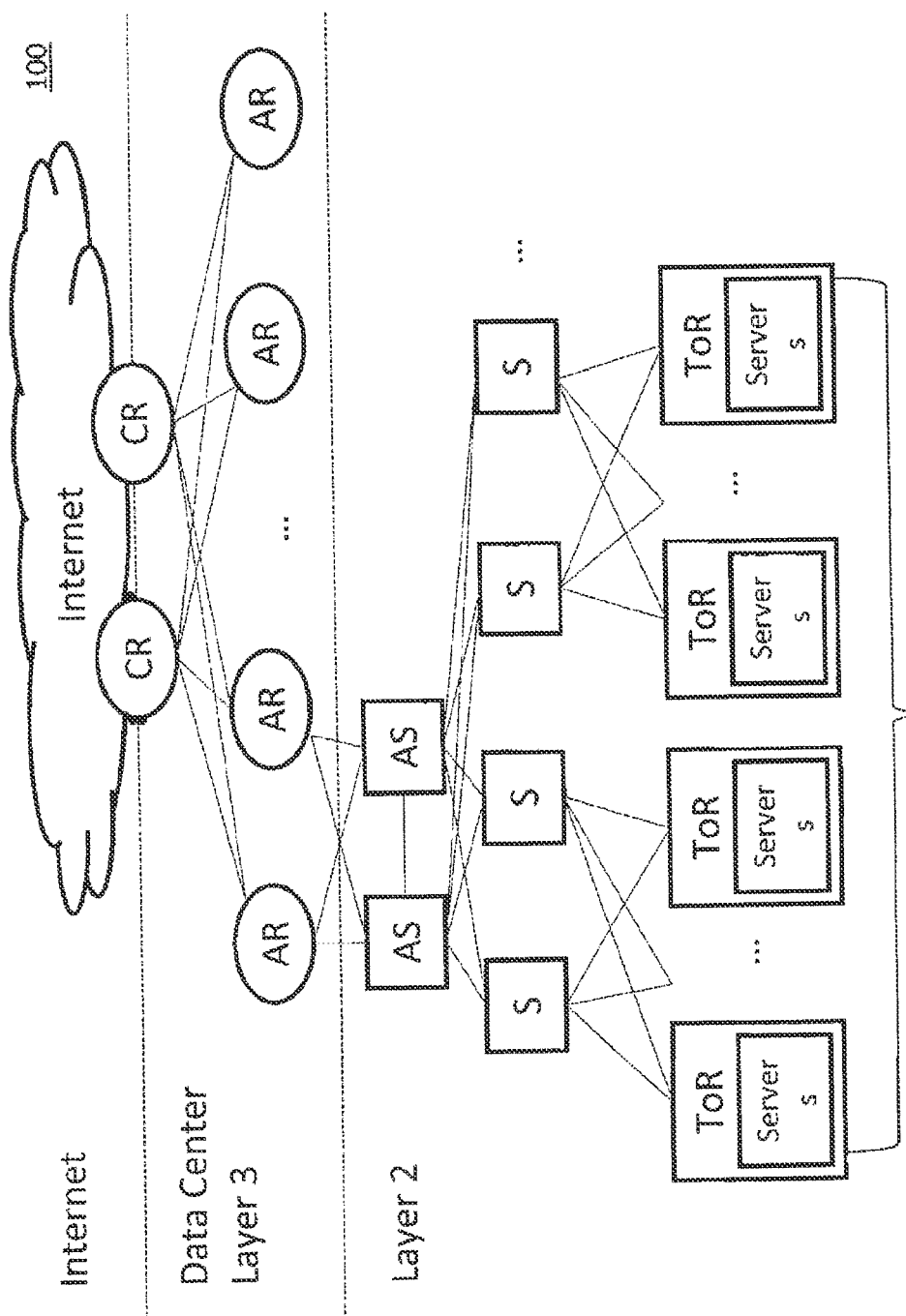
FIG. 1 schematically illustrates a network architecture of a conventional data center.
Figure 2:
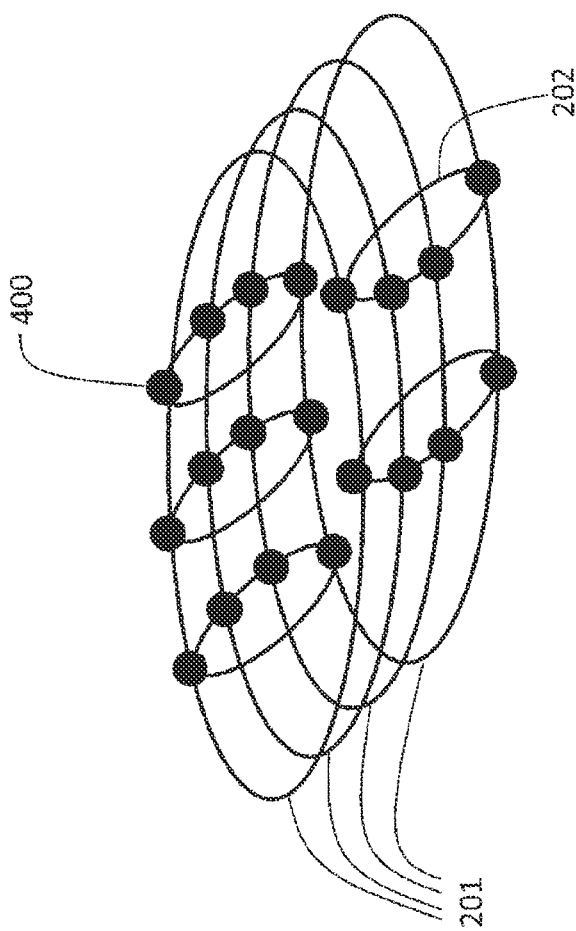
FIG. 2 schematically illustrates a data transmission system according to an embodiment.

FIG. 2 schematically illustrates an embodiment for an optical data transmission system 200 for a data center which is based on a torus topology. The data transmission system 200 comprises a main optical packet ring 201 comprising a number N of separate packet transmission channels. Each packet transmission channel may be implemented e.g. as a separate fiber of a multi fiber cable, a core of a multi core fiber, a mode of a multi mode fiber, or a wavelength of a multi wavelength division fiber. In case of a multi fiber cable, a multi core fiber, or a multi mode fiber, each fiber/core/mode may be further used in wavelength division multiplex to carry multiple wavelengths (e.g. W wavelengths).

Along the main optical packet ring 201 POADM (Packet Optical Add Drop Multiplex) nodes 400 are arranged. Each node 400 is coupled with one packet transmission channel of the main optical packet ring 201. N nodes 400, each coupled with a different packet transmission channel, are connected by a secondary optical packet ring 202. The set of nodes 400 coupled by a secondary optical packet ring 202 is called a super node 500. Thus, the main optical packet ring 201 is connecting the super nodes 500 while the secondary optical packet rings 202 provide for connectivity of nodes 400 within the super nodes 500 and, since each node 400 is connected with only one packet transmission channel of the main optical packet ring 201, provide for inter channel connectivity.

In an example, up to W secondary optical packet rings 202 are provided, each comprising N nodes 400. This arrangement allows to fully interconnect N×W nodes 400 without bottleneck and without any central control. A data interface including an Ethernet switch may be connected with each node 400. This allows connecting a number (e.g. 10 or 20) of server computers with each node 400 of the data transmission system 200 and provides for a fully connected network architecture to support data traffic between the servers.

In an embodiment, a data transmission system comprises a main optical packet ring 201 and a plurality of nodes 400 positioned along the main optical packet ring 201 and partially interconnected by secondary optical packet rings 202. The nodes 400 are configured such that an optical data packet propagating on a packet transmission channel of the main optical packet ring 201 and being addressed towards a data interface (i.e. a data storing/retrieving unit) of a destination node can be received by at least one node which is connected to the packet transmission channel and to the destination node via a secondary optical packet ring 202. As already mentioned above, the main optical packet ring 201 may be a multi mode/multi core ring. In an embodiment, the secondary optical packet rings may be single mode/core fiber rings.

In this way, even if a data storing/retrieving unit (e.g. a server unit comprising data storage/retrieving functionality) and a corresponding destination node is not directly connected to a fiber or core or mode of the main optical packet ring via which an optical packet directed to the destination data storing/retrieving unit is sent, the optical packet can nevertheless by picked up by another node connected to the respective fiber/core/mode of the main optical packet ring via which the optical packet directed to the destination data storing/retrieving unit is sent. The optical packet is then routed via a secondary optical packet ring to the destination node and data storing/retrieving unit. Similarly, if a data storing/retrieving unit of a source node wants to send an optical packet to a particular fiber/core/mode of the main optical packet ring which is not directly connected to the source node (i.e. if the first receiver/transmitter of the source node is not connected to this fiber/core/mode), the optical packet may be first routed via a secondary optical packet ring of the source node to a different node which is directly connected to the particular fiber/core/mode of the main optical packet ring (via its first receiver/transmitter). The optical packet is then sent from this node to the particular fiber/core/mode of the main optical packet ring, and subsequently received at its destination node (via the respective node connected to the particular fiber/core/mode of the main optical packet ring). Thus, full connectivity among all data storing/retrieving units of the network is achieved.

Figure 3:
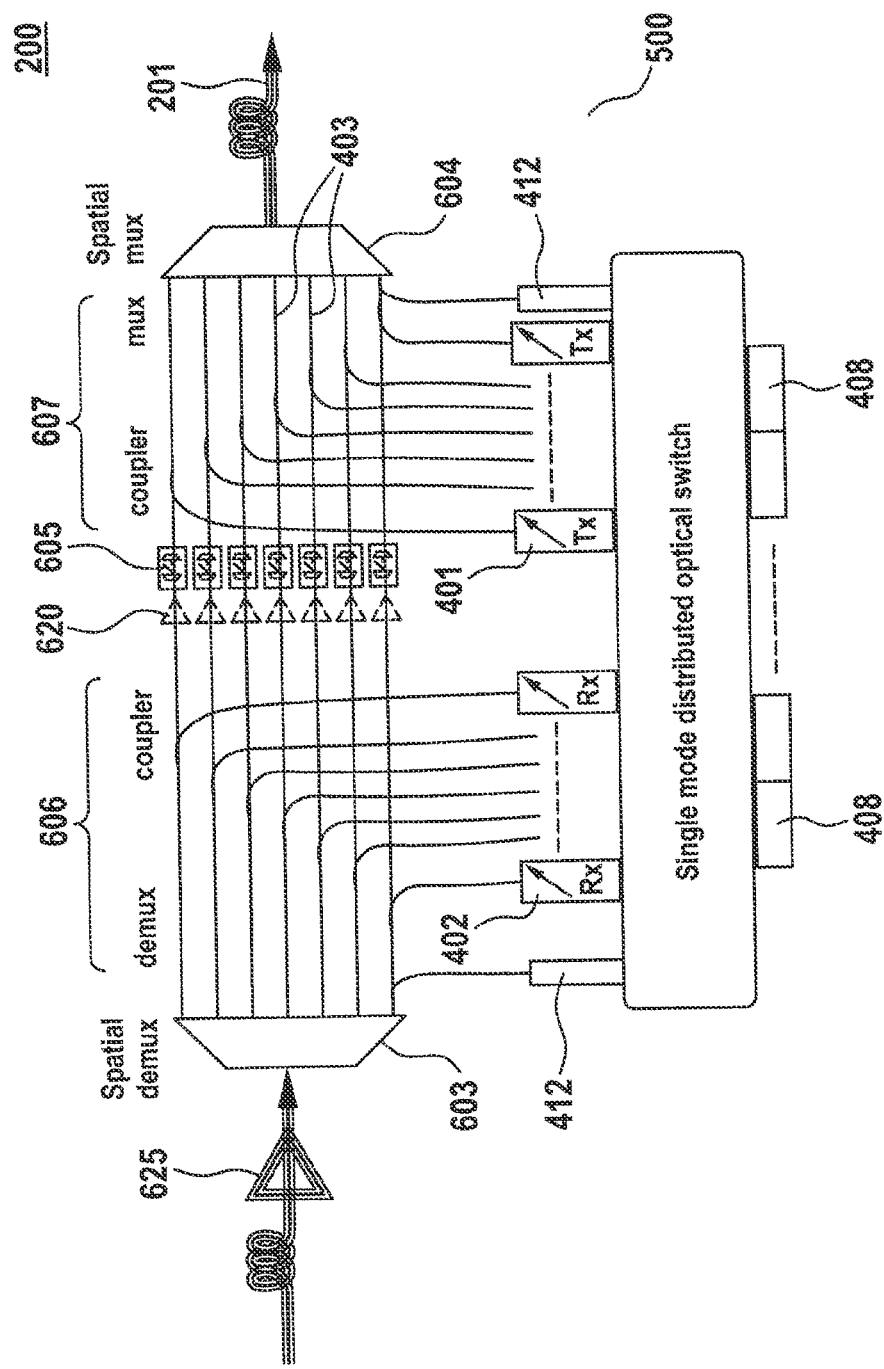
FIG. 3 schematically illustrates a data transmission system according to an embodiment.
Figure 4:
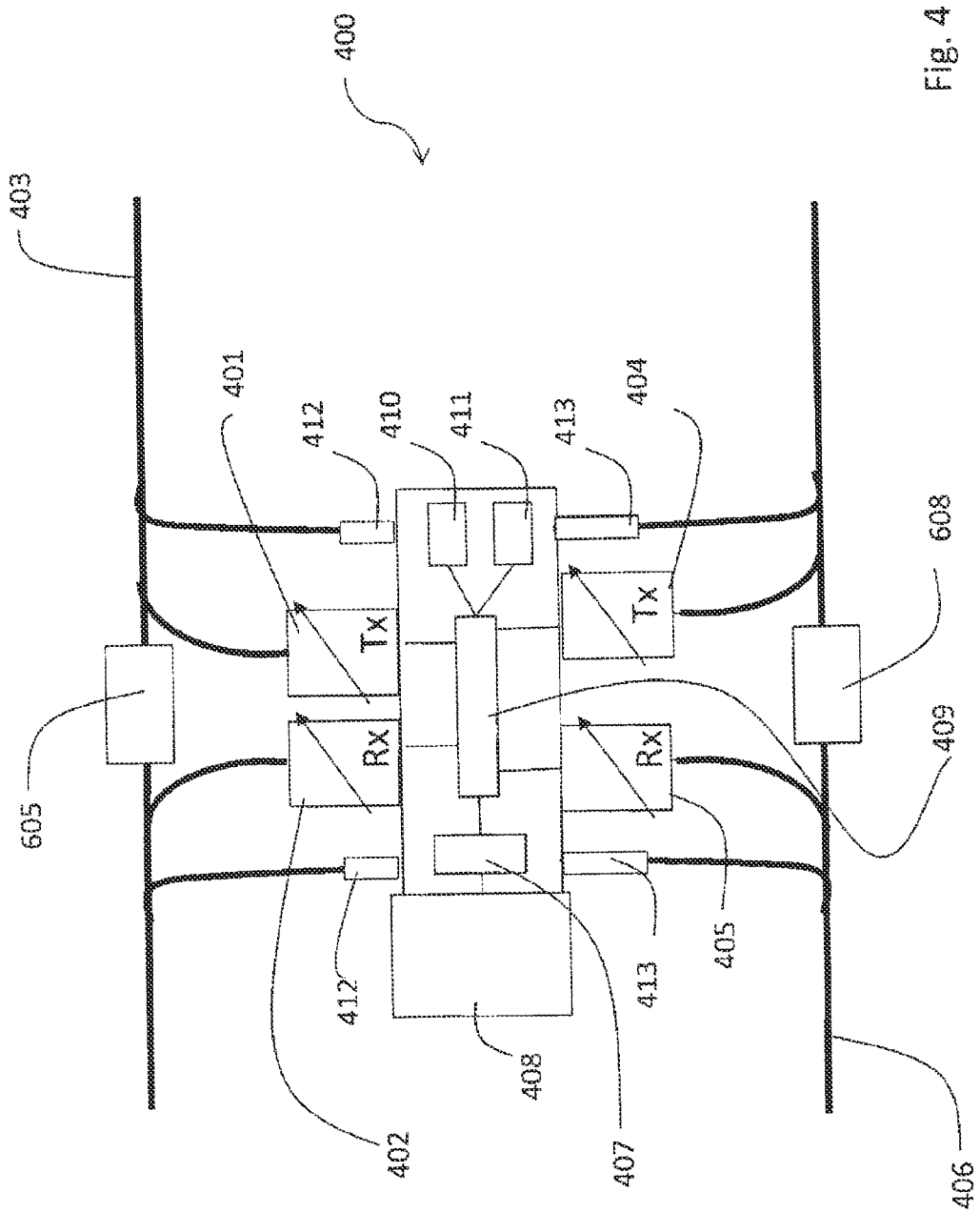
FIG. 4 schematically illustrates a node according to an embodiment which may be used in the data transmission system shown in FIG. 3.

FIG. 4 shows an embodiment of a node 400 (in the following also referred to as optical packet switching apparatus or "ToR") which may be used in the data transmission system 200 shown in FIG. 3, comprising: a first transmitter unit 401 and a first receiver unit 402 respectively connectable to a first optical fiber 403 of a first (main) optical packet ring 201; a second transmitter unit 404 and a second receiver unit 405 respectively connectable to a second optical fiber 406 of a secondary optical packet ring 202; a data interface 407 connectable to at least one data processing unit 408 (e.g. a set of connected servers, each comprising a data storage unit; in the following also referred to as data storing/retrieving unit 408); and a switching unit 409 connected to the first transmitter unit 401, the first receiver unit 402, the second transmitter unit 404, the second receiver unit 405, and the data interface 407. The first optical fiber 403 is coupled with the main optical packet ring 201 so that the first transmitter unit 401 and the first receiver unit 402 are coupled to a particular packet transmission channel of the main optical packet ring 201.

The optical packet switching apparatus (node) 400 may be configured to selectively establish connection paths between the first receiver unit 402 or the second receiver unit 405 and the first transmitter unit 401 or the second transmitter unit 404 (e.g. in case that an optical data packet received at the optical packet switching apparatus 400 is to be routed to a further optical packet switching apparatus). The optical packet switching apparatus 400 may further be configured to selectively establish connection paths between one of the first receiver unit 402, the second receiver unit 405, the first transmitter unit 401, or the second transmitter unit 404 and the data interface 407 (e.g. in case that an optical data packet received at the optical packet switching apparatus 400 is to be routed to the data processing unit 408, or an optical data packet is to be retrieved from the data processing unit 408 and transmitted to another data processing unit 408).

The main optical packet ring 201 is configured to provide a plurality of separate (physical) packet transmission channels. Typically, each packet transmission channel uses a separate optical signal for transmission of optical packets. For example, the main optical packet ring 201 comprises a multi mode optical fiber being configured to allow simultaneous propagating of signals of different optical modes. Alternatively, the main optical packet ring may comprise a multi core optical fiber, each core being configured to allow propagation of at least one optical signal. Still alternatively, the main optical packet ring may comprise a multi fiber cable comprising a bundle of optical fibers, each optical fiber being configured to allow propagation of at least one optical signal. Further, the main optical packet ring may comprise a multi wavelength optical fiber being configured to allow simultaneous propagation of signals of different wavelengths.

The transmitter units 401, 404 and the receiver units 402, 405 may be fast wavelength tunable and may transmit and receive optical packets. The transmitter units 401, 404 and the receiver units 402, 405 may change the wavelength for processing of each optical packet. If an optical data packet is routed from the main optical packet ring to the secondary optical packet ring and vice versa, an optoelectronic conversion is carried out in the corresponding optical packet switching apparatus 400.

In an embodiment, the optical packet switching apparatus 400 comprises a first optical packet control interface 410 connectable to a first optical packet blocker 605 coupled into the first optical fiber 403. The switching unit 409 is configured to send first blocking information through the first optical packet control interface 410 to the first optical packet blocker 605. The first blocking information indicates whether optical packets guided through the first optical fiber 403 (and thus the main optical packet ring) are to be blocked or passed through (or transmitted) by the first optical packet blocker 605. The optical packet switching apparatus 400 may further comprise a second optical packet control interface 411 connectable to a second optical packet blocker 608 coupled into the second optical fiber 406. The switching unit 409 is configured to send second blocking information through the second optical packet control interface 411 to the second optical packet blocker 608. The second blocking information indicates whether optical packets guided through the second optical fiber 406 (and a secondary optical packet ring) are to be blocked or passed through (or transmitted) by the second optical packet blocker. The first optical packet control interface 410 and/or the second optical packet control interface 411, and thus the control of the first optical packet blocker 605 and the second optical packet blocker 608, may be respectively located outside of the optical packet switching apparatus 400, e.g. in a central control unit for a plurality of nodes, typically the nodes connected to a particular secondary packet ring.

In an embodiment, the optical packet switching apparatus 400 comprises a first control information interface 412 connectable to the first optical fiber 403. The switching unit 409 is configured to receive/send control information via the first control information interface 412 from/to the first optical fiber 403, and hence the main optical packet ring. The switching unit 409 further comprises a second control information interface 413 connectable to the second optical fiber 406, and hence the secondary optical packet ring. The switching unit 409 is configured to receive/send control information via the second control information interface 413 from/to the second optical fiber 406. The selective establishment of connection paths between the first receiver unit 402 or the second receiver unit 405 and the first transmitter unit 401 or the second transmitter unit 404, or between one of the first receiver unit 402, the second receiver unit 405, the first transmitter unit 401, or the second transmitter unit 401 and the data interface 407 is carried out based on control information received via the first control information interface 412 or via the second control information interface 413 (i.e. via the main optical packet ring or via the secondary optical packet ring).

As schematically shown in FIG. 4a, several of the optical packet switching apparatuses or nodes 400 may be combined with each other to form a super node 500. The super nodes 500 are arranged along the main optical packet ring 201 which connects the super nodes 500 with each other. The part of a super node 500 which is connected with the main optical packet ring 201 is called End of Row (EoR) Packet Optical Add Drop Multiplexer (POADM) 502, while the part of the super node 500 which is connected with a secondary optical packet ring 202 is called Top of Rack (ToR) POADM 503. The EoR and ToR POADMs may be implemented as variations of standard POADM nodes as partially illustrated schematically in FIG. 5. Thus, in the main optical packet ring 201, EoR POADMs 502 are placed. In the secondary optical packet ring 202, ToR POADMs 503 are placed.

A possible realization of the network concept depicted in FIG. 2 is illustrated in FIG. 3. FIG. 3 shows a data transmission system 200, comprising: a main optical packet ring 201; and a plurality of super nodes 500 (only one super node 500 is shown in FIG. 3) positioned along the main optical packet ring 201. The main optical packet ring 201 typically comprises a plurality of separate packet transmission channels, e.g. a multi core or mode fiber or a bundle of fibers, and is operated in wavelength division multiplex (WDM). Each super node 500 comprises a plurality of data interfaces 407 (as shown in FIG. 4) connected respectively to data processing units 408 (e.g. for storing/retrieving of data in a data center), a plurality of first tunable receiver units 402 operating at multiple wavelengths, a plurality of first tunable transmitter units 401 operating at multiple wavelengths, and an internal optical data connection 406 connecting the data processing units 408 (i.e. connecting the corresponding data interfaces) of a super node 500 with each other. Typically, the internal optical data connection 406 of a super node 500 is a secondary optical packet ring 202. Each data storing/retrieving unit 408 is connected via one of the first receiver units 402 and via one of the first transmitter units 401 to the main optical packet ring 201, respectively. The super node 500 is configured such that an optical data packet propagating in the main optical packet ring 201 and being addressed towards a data storing/retrieving unit 408 of a super node 500 can be received by at least one of the first receiver units 402 assigned to the super node 500.

FIG. 3*a* illustrates in more detail a possible embodiment of a super node 500 comprising a plurality of nodes 400. Each super node 500 comprises a plurality of second tunable receiver units 405, a plurality of second tunable transmitter units 404, and a secondary optical packet ring 202 which, as an internal data connection 406 of the super node 500, connects all nodes 400 (and thus all data storing/retrieving units 408) assigned to the super node 500 with each other. Each node (and thus each data storing/retrieving unit 408) is connected via one of the second receiver units 405 and via one of the second transmitter units 404 to the secondary optical packet ring 202, respectively.

In this way, even if a data storing/retrieving unit 408 (e.g. a server unit comprising data storage/retrieving functionality), i.e. a corresponding node 400, is not directly connected to a fiber/core/mode of the main optical packet ring 201 via which an optical packet directed to the data storing/retrieving unit 408 is sent, it can nevertheless by picked up by a different node 400 of the super node 500 which is connected to the fiber/core/mode of the main optical packet ring 201 via which the optical packet directed to the data storing/retrieving unit 408 is sent, and then routed via the secondary optical packet ring 202 to the desired data storing/retrieving unit 408. Similarly, if a data storing/retrieving unit 408, i.e. a node 400, wants to send an optical packet to a particular fiber/core/mode of the main optical packet ring 201 which is not directly connected to the node 400, the optical packet may first be routed via the secondary optical packet ring 202 to a different node 400 of the super node 500 directly connected to the particular fiber/core/mode of the main optical packet ring 201, and then sent from this node 400 to the particular fiber/core/mode of the main optical packet ring 201.

The data transmission system 200 may for example be used as network infrastructure for interconnecting a large number of servers in a data center (each server or set of servers corresponding to a data processing unit 408). The servers can exchange data between each other using the main optical packet ring 201 and the plurality of internal optical data connections 406 (secondary optical packet rings 202 assigned to the super nodes 500, respectively). Each server is connected to another server by only the main optical packet ring 201 and at most two (typically only one) secondary optical packet rings 202. This means that the number of necessary cables to achieve full connectivity is very low.

For example, data may be sent by a data center server (data storing/retrieving unit 408) to a first ToR POADM 503 (i.e. to a data interface 407). There, it is encapsulated into an optical packet and sent to a first EoR POADM 502 which then sends the optical packet via the main optical packet ring 201 to a second EoR POADM 502. The second EoR POADM 502 forwards the optical packet to a second ToR POADM 503 which then sends the optical packet to a destination ToR POADM 503 using a secondary optical packet ring 202. EoR-EoR connections are through the main optical packet ring 201. ToR-ToR connections are through secondary optical packet rings 202. EoR-ToR connections are through dedicated links within a super node 500 (e.g. 1200, 1200 in FIGS. 6-8).

A secondary optical packet ring 202 may be a single mode fiber ring. A plurality of amplifiers 602 may be placed into the single mode fiber ring, the amplifiers 602 respectively amplifying a signal propagating through the single mode fiber ring. Due to the short length of the fibers in the secondary optical packet ring 202, the number of amplifiers 602 may be lower than the number of nodes 400 connected to the single mode fiber ring.

The main optical packet ring 201 comprises a plurality of physical packet transmission channels which may be implemented by using a single fiber core being configured to allow simultaneous propagation of signals of different optical modes. Alternatively, the main optical fiber ring 201 may comprise a plurality of fiber cores, each core being configured to allow propagation of a signal of one optical mode, or to allow simultaneous propagation of signals of different optical modes. Alternatively, the main optical fiber ring 201 may comprise a multi fiber cable comprising a bundle of fiber cores Referring now again to FIG. 3, each super node 500 comprises a spatial demultiplexer 603, a spatial multiplexer 604, and a plurality of first optical fibers 403 respectively connecting the individual channels of the spatial demultiplexer 603 with the spatial multiplexer 604. Furthermore, add/drop means are provided to connect the first optical fibers 403 with the first transmitters 401 and/or the first receivers 402. The spatial demultiplexer 603 is placed into to the main optical packet ring 201 to demultiplex the packet transmission channels propagating through the main optical packet ring 201 into several signals respectively propagating through one of the first optical fibers 403 towards the spatial multiplexer 604. The spatial multiplexer 604 is connected to the main optical packet ring 201 and multiplexes received signals respectively propagating through one of the first optical fibers 403 (corresponding to individual packet transmission channels) and/or one or more optical signals generated by first transmitter(s) 401 into the main optical packet ring 201. Typically each of the first receiver units 402 is connected to a different first optical fiber 403. Further, each of the first transmitter units 401 is connected to a different optical fiber 403.

FIG. 3 also shows a set of optional amplifiers 620 which are placed into the first optical fibers 403 to respectively amplify the separated optical signals of the packet transmission channels. Alternatively or in addition, a common amplifier 625 may be used to jointly amplify all packet transmission channels. The common amplifier 625 may be a multi wavelength or multi mode amplifier if the packet transmission channels are implemented via WDM or multi mode transmission.

Each super node 500 further comprises a plurality of first optical packet blockers 605. The first optical packet blockers 605 are placed into the first optical fibers 403 between a first (de)-coupling area 606 in which the first receiver units 402 are coupled to the main optical packet ring 201, and a second coupling area 607 in which the first transmitter units 401 are coupled to the main optical packet ring 201. The first optical packet blockers selectively block transmission of optical data packets propagating through the corresponding first optical fibers 403 in dependence on control information. The first optical packet blocker 605 may be a silicon photonics packet blocker and may comprise one gate per wavelength or per core or per fiber (if the main optical packet ring 201 is a multi fiber ring).

Each super node 500 further comprises a plurality of second optical packet blockers 608. Each second optical packet blocker 608 is assigned to a different node 400 or its respective data storing/retrieving unit 408, and is placed in the secondary optical packet ring 202 between a first coupling area 609 in which a second receiver 405 assigned to the node 400 is coupled to the secondary optical packet ring 202, and a second coupling area 610 in which a second transmitter 404 assigned to the node 400 is coupled to the secondary optical packet ring 202. The second optical packet blocker 608 blocks transmission of optical data packets on the secondary optical packet ring 202 in dependence on control information.

The control information may propagate through the main optical packet ring 201 in synchronization with the corresponding optical data packets. For example, the control information propagates through the main optical packet ring 201 using a dedicated control channel. Alternatively, one or more fibers/cores/modes could be dedicated to carry control data for all optical packets carried on all wavelengths and fibers/cores/modes. Control information may further propagate through the secondary optical packet ring 202 in synchronization with the corresponding optical data packets. The generation of the first blocking information and the second blocking information may be based on control information received via the first control information interface 412 from the main optical packet ring 201 or via the second control information interface 413 from the secondary optical packet ring 202.

The first transmitter unit 401 and the first receiver unit 402 and/or the second transmitter unit 404 and the second receiver unit 405 may be configured to operate on variable wavelengths. For example, optical signals of M different wavelengths (e.g. M=80) may be used, which means that the first transmitter unit 401 and the first receiver unit 402 and/or the second transmitter unit 404 and the second receiver unit 405 would have to be able to operate on M different wavelengths as well (wavelength division multiplexing). Each of the optical fibers 403, 406 may carry signals of multiple wavelengths or a single wavelength.

In the following, an example architecture for a possible implementation of an optical packet switching apparatus or node is illustrated. Typically, an optical ring network (see e.g. FIG. 4a) comprises packet optical add-drop multiplexers (POADM) and a hub node (not shown) connected by optical links, e.g. optical fibers. The ring may have single direction of propagation of the optical packets. Alternatively, the ring could be bidirectional. Typically, the ring network is a time-slotted network where data is transmitted within fixed-duration packets over the optical links. Data is transmitted within optical packets carried on N wavelength channels. The optical packets are WDM-multiplexed over the optical links. A header that contains control data of a packet is associated a to each optical packet, including routing information, e.g. the destination, and format information, e.g. the client protocol being encapsulated. This information may be provided in the form of a numerical code similar to an Ethertype. Packets are transmitted synchronously over all wavelength channels. The packet duration is called a slot. For each slot, the headers for all packets transmitted during that slot may be transmitted as a separate optical packet over a separate wavelength channel called control channel $\lambda_c$. Hence, data channels $\lambda_1$ to $\lambda_N$ carry optical packets while the control channel $\lambda_c$ carries the headers of the packets. On data channels $\lambda_1$ to $\lambda_N$, each optical packet is separated from the preceding by an inter-packet guard band. On control channel $\lambda_c$, the structure of traffic may be similar to or different from the data channels. Namely, the duration of guard band on the control channel $\lambda_c$ may be equal to or different from that of inter-packet guard band. Alternatively, the control channel may be implemented as a continuous signal with no guard band at all.

POADMs can insert or add traffic on any wavelength via transmitters 401 and 404 thanks to one or more fast tunable lasers, and can receive or drop traffic on specific wavelengths thanks to reconfigurable burst-mode receivers 402, 405. The POADMs can also let traffic pass transparently through the node, without a conversion to the electrical domain. The (optional) hub node is a different type of node which converts to the electrical domain all the incoming optical packets on the one side, and fills all slots on all wavelengths with light, i.e. either data packets or dummy packets, on the other side. The hub node can interface with another network in a known manner.

In the optical packet switching network, a first POADM can generate an optical packet comprising a payload encapsulating a plurality of data frames having a same format, e.g. data frames coming from one or more client devices. At the same time, the POADM generates control data associated to the optical packet. The generated control data comprises format data indicating the format of the encapsulated data frames. At a destination node, the optical packet is received and demodulated to obtain an electrical signal comprising the payload. The associated control data is received and used to configure an electronic switch as a function of the format data, so as to transfer the electrical signal to a selected extraction module adapted to recover the data frames from the electrical signal.

With reference to FIG. 5, a possible POADM architecture for implementation of a super node 500 (in particular an End of Row POADM 502) is illustrated. FIG. 5 shows optical components including the first optical packet blockers 605. The interaction between these components will be described. A similar architecture may also be used to realize the second optical packet blockers 608 and (parts of) the node 400.

With reference to FIG. 5, the optical switching fabric 720 comprises most of the components that operate in the optical domain. An input fiber 721 (corresponding e.g. to fiber 403 within first coupling area 606) serves to receive WDM (wavelength division multiplexing) traffic from the nodes 400 located upstream in the main optical packet ring 201 and an output fiber 722 (corresponding e.g. to fiber 403 within second coupling area 607) serves to transmit WDM traffic to the nodes 400 located downstream in the main optical packet ring 201. In FIG. 5, it is assumed that the optical receivers 402 are connected to one single fiber 721. However, each of the optical receivers 402 may be connected to a different fiber 403, as shown in FIG. 3. In the same way, each optical transmitter 401 may be connected to a different fiber 403, as shown in FIG. 3.

In an embodiment, the control channel is processed as follows: the control channel is first extracted from the input fiber 721 using an optical splitter or demultiplexer 723, an optical line 724 and an optical transponder 725 with a wavelength-specific filter. After reception, the demodulated control data is processed by the node controller 729, which serves also to generate the outgoing control packets on the control channel using a fixed-wavelength transponder 726. The outgoing control channel is injected through a coupler or multiplexer 727 into the output fiber 722 where it is multiplexed with the outgoing data packets. In this example, the control channel is opaque, namely it is submitted to optical-to-electrical and electrical-to-optical conversions at each node.

The data channels are processed as follows: optical packets arrive in the optical input fiber 721, multiplexed over M wavelengths. To improve the node modularity and upgradability, a coarse demultiplexer 730 connected to input fiber 721 splits the spectrum of M wavelengths into K=M/M' bands of M' wavelengths each, where K, M and M' are integer numbers greater than 1. Hence, the M incoming wavelength channels are first band demultiplexed. Each band of M' channels is then sent through an optical line 732 to an integrated optical switching block 731 capable of switching optical packets on each of the M' channels independently. Receivers 402 receive incoming optical packets from the input fiber 721 through the power splitters 749 and 739.

The integrated optical switching block 731 serves to process transit traffic. The switching block 731 contains a 1:M demultiplexer 733 to separate all M wavelength channels of the band, an array of M SOA (Semiconductor Optical Amplifier) gates 734 (also other types of gates may be used), and an M:1 multiplexer 735. Each SOA gate 734 can be triggered at the packet duration granularity to block a packet or let it pass through (based on a control signal 770 coming from controller 729). In addition each SOA gate 734 can optionally act as an amplifier so as to equalize power of the packets, which is an operational requirement for burst-mode receivers. Packets that are allowed to transit are then multiplexed in wavelength through the M:1 multiplexer 735. This design of the switching block 731 enables integration into a PIC (photonics integrated circuit), which decreases manufacturing costs and reduces the space footprint of the POADM. In addition, the capacity of the node can be upgraded through the addition of blocks 731.

At the output of the POADM, the optical packets coming from the K integrated optical switching blocks 731 through optical lines 737 are multiplexed by a coarse multiplexer 736. The added packets coming from the transmitters 401 are inserted into the output fiber 722 through combiners 738 and 748.

The switching fabric 720 may include some optical buffer mechanisms at different locations in the optical transit path to generate sufficient delay for the control data to be processed while optical data packets are transiting. For example, fiber delay lines 747 may be provided for that purpose on each optical line 737 and/or on each optical line 732 as schematically shown on FIG. 5. Such fiber delay lines may also be arranged right before coarse demultiplexer 730 or right after coarse multiplexer 736.

The controller 729 handles synchronization between packets across wavelength channels, insuring that no added packet is inserted at a time and wavelength that conflicts with a transiting packet; and that all time slots cleared out by the optical gates 734 are indeed filled up by an added packet, such that after the coarse multiplexer 736 and combiner 738, there is no space on any wavelength except for those corresponding to inter-packet guard bands. At the output of the POADM, there is an optical packet in each time slot, on each wavelength channel. When no useful data is available for insertion in a free slot, a dummy packet can be inserted by the add module. A dummy packet is an optical packet with no meaningful content that is used for physical layer-related purposes, namely keeping power received by the optical amplifiers roughly constant over time. Alternatively, the optical packet occupying that slot in the input fiber 721 can be left to transit through the POADM, even though the packet is not intended to any downstream node. In such case, the optical packet is also marked as "dummy" on the control channel but it is not physically erased by the SOA gates.

Figure 6:
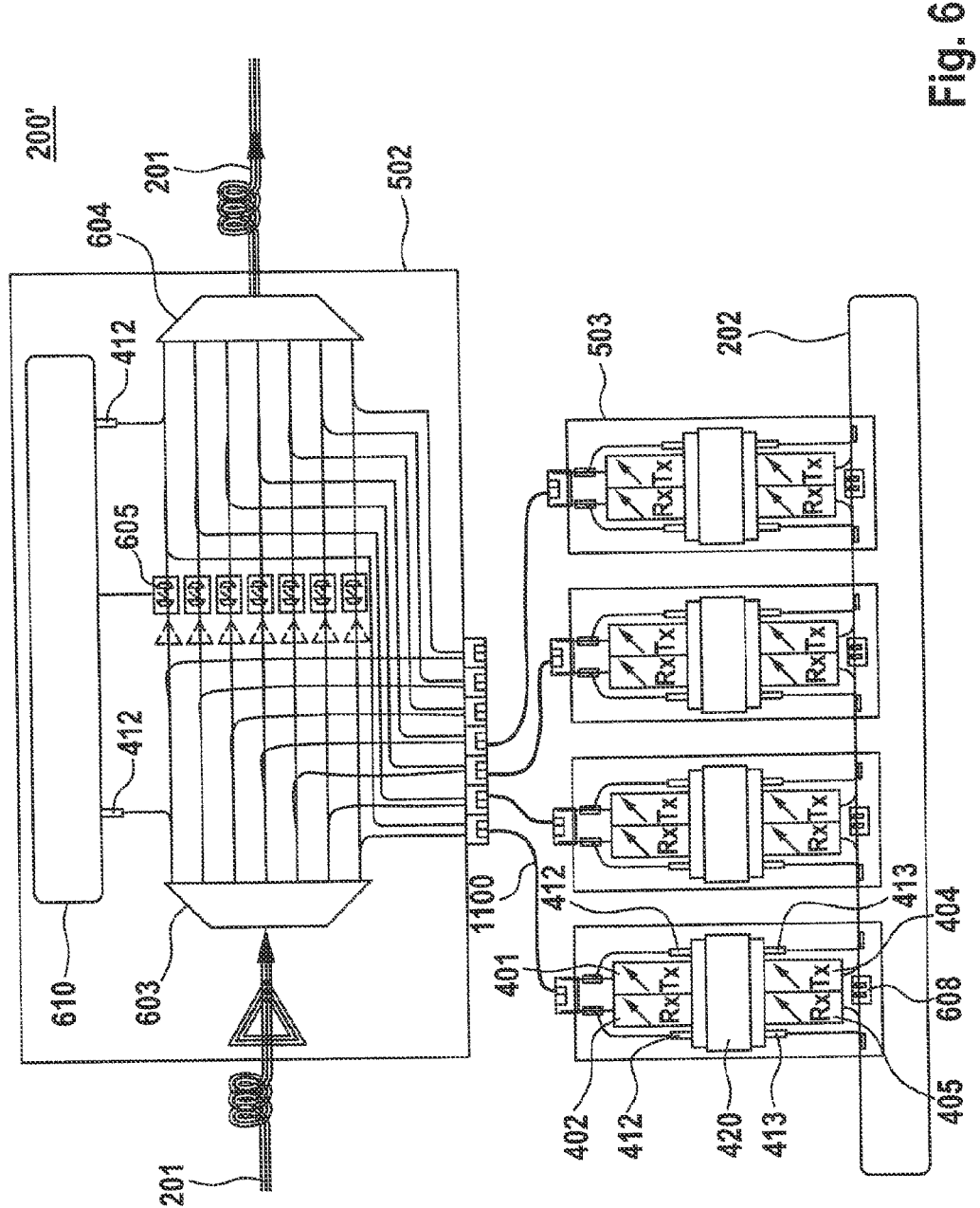
FIG. 6 schematically illustrates a data transmission system according to an embodiment.

FIG. 6 shows a further possible realization of the network concept depicted in FIG. 3. The architecture of the data transmission system 200' shown in FIG. 6 basically corresponds to the architecture of the data transmission system 200 shown in FIG. 3 (Elements 407, 409, 410, and 411 shown in FIG. 4 are summarized in FIG. 6 by reference sign 420). However, the first transmitter 401 and the first receiver 402 of a node 400 are connected to the respective first optical fiber 403 via an optical connection 1100 (e.g. a Wavelength Division Multiplexing (WDM) optical connection). This allows coherent transmission and reception (TRX) of traffic in the main optical packet ring 201 via the first transmitter 401 and the first receiver 402, both arranged within the node 400. The length of the optical connection 1100 (fiber) may be synchronized with the main optical packet ring 201, e.g. by considering that 1 m of fiber corresponds roughly to 4.83 ns delay, and providing corresponding delay units/lines. Thus, the traffic in the main optical packet ring 201 and the traffic in/out/through the nodes 400 is kept in synchronization.

In this embodiment, the first optical packet control interface 610 is arranged centrally for all nodes 400 of a super node 500 outside the respective nodes 400. That is, control of the first optical packet blockers 605 is provided outside the nodes 400. In this embodiment, one control channel is used for all cores/modes/wavelengths/fibers. Alternatively, one control channel may be used per core/mode/wavelength/fiber. In this case, each control channel may carry information about the packets transported by the associated core/mode/wavelength/fiber. (Routing) information for all cores and all wavelengths may be spread across the cores and wavelengths arbitrarily. Control of the second optical packet blockers 608 is done by second optical packet control interfaces 411 (not shown) which may be located in the nodes 400, but may also be located outside the nodes 400. Each data storing/retrieving unit 408 may be uniquely connected to only one packet transmission channel (e.g. fiber/core/mode). The data storing/retrieving units 408 may for example be a set of 10 to 40 server computers accessible by an Ethernet switch arranged in the data interface 407.

Figure 7:
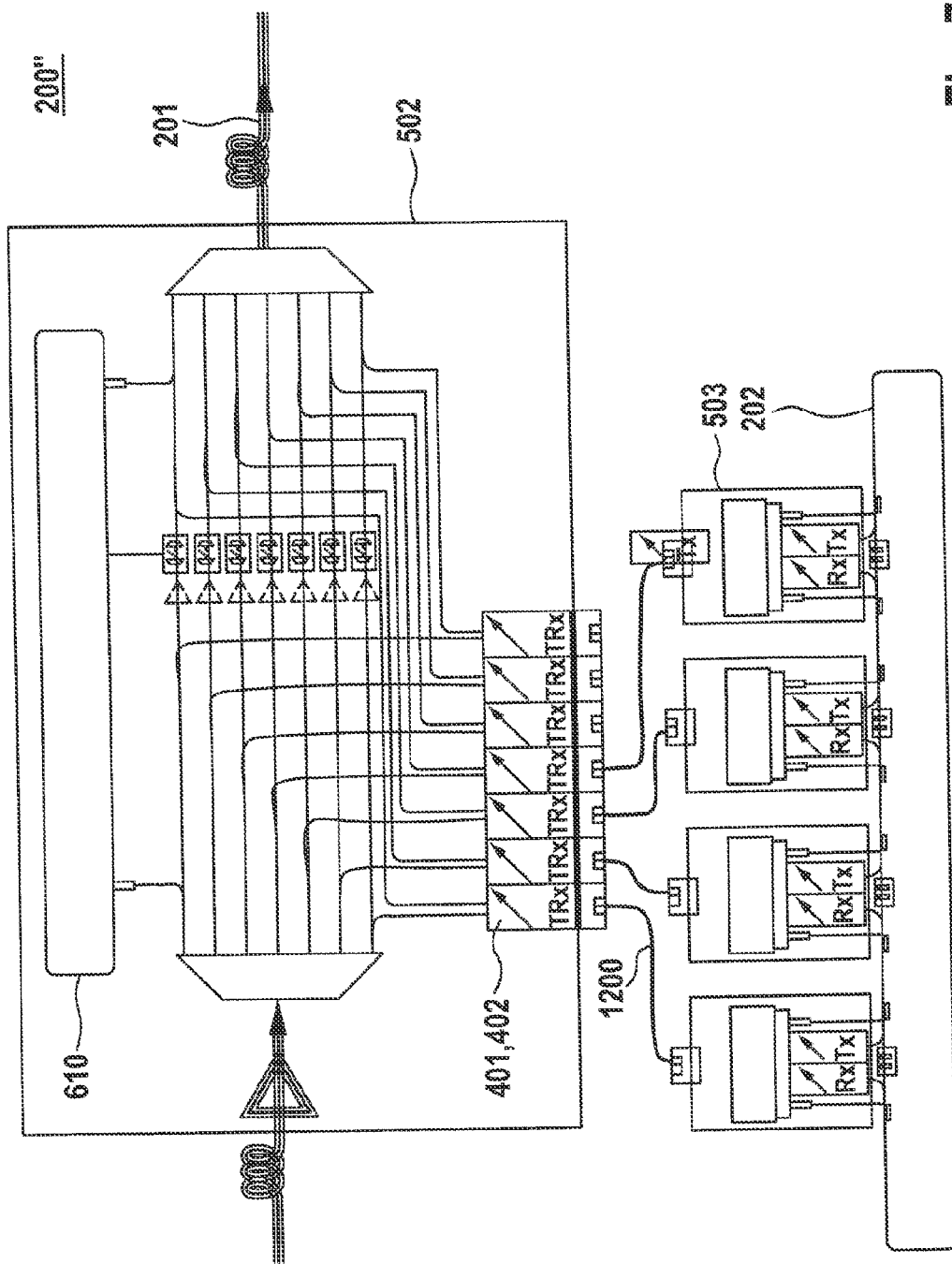
FIG. 7 schematically illustrates a data transmission system according to an embodiment.

FIG. 7 shows a further possible realization of the network concept depicted in FIG. 3. The architecture of the data transmission system 200" shown in FIG. 6 basically corresponds to the architecture of the data transmission system 200' shown in FIG. 6. However, the first transmitters 401 and the first receivers 402 (both for coherent TRX) are all located within the EoR node 502 and coupled via cable connection 1200 to their respective ToR nodes 503. This allows separation of multi mode/core equipment for the main optical packet ring 201 from the single mode equipment of the secondary optical packet ring 202 (and the data interface 407 and possibly the data storing/retrieving unit 408). For example, the first transmitter 401 and the first receiver 402 of all nodes 400 may be placed within the enclosure of the multi mode/core equipment of the EoR node 502. A (mono-wavelength) optical or electrical connection 1200 may be provided between the first transmitter 401, the first receiver 402 and the corresponding ToR node 503. Further, an adaptation layer is provided in the ToR node 503 to interface with the cable connection 1200. In this embodiment, one control channel for all cores/modes may be used. Alternatively, one control channel can be used per core/mode. Each data storing/retrieving unit 408 may be uniquely connected to only one core/mode.

Figure 8:
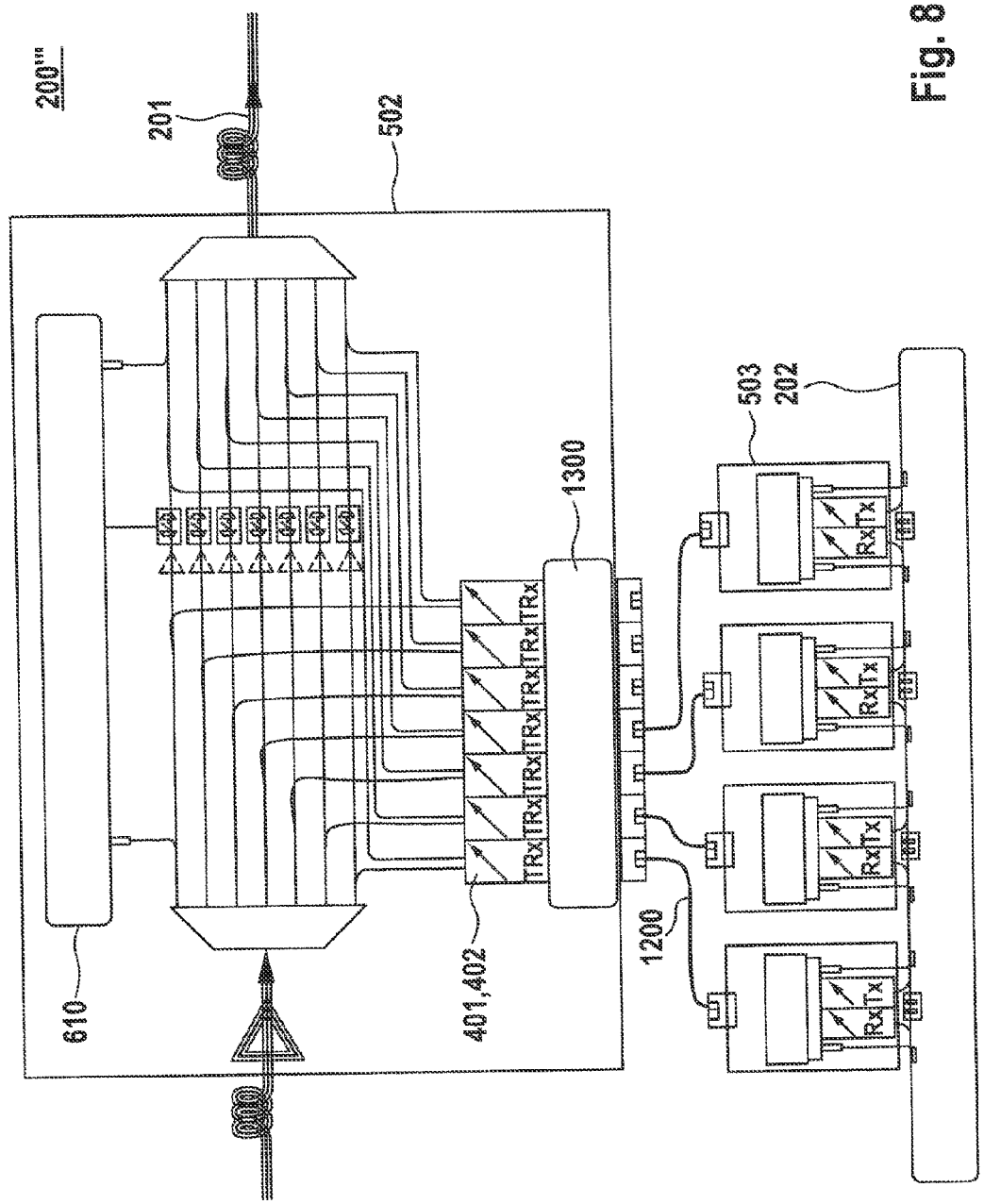
FIG. 8 schematically illustrates a data transmission system according to an embodiment.

FIG. 8 shows a further possible realization of the network concept depicted in FIG. 3. The architecture of the data transmission system 200''' shown in FIG. 8 basically corresponds to the architecture of the data transmission system 200" shown in FIG. 7. However, the first transmitters 401 and the first receivers 402 of the nodes 400 are connected with each other with a switch 1300. The switch enables to connect each data storing/retrieving unit 408 directly with each core/mode of the main optical packet ring 201. In this embodiment, one control channel for all cores/modes may be used. Alternatively, one control channel can be used per core/mode. One control channel/node controller may be used per mode/core. The controller 610 used for controlling the first optical packet blockers 605 is different from that for controlling the second optical packet blockers 608.

In the following, further aspects and advantages of embodiments will be described.

The proposed data transmission system 200 enables to connect all ToRs (via data interfaces 407) of a data center in a (logical) full mesh manner (as an overlay over a physical fiber ring). The multi (fiber/core/mode) fiber enables to increase the number of connected ToRs by a factor of N, N being the number of fibers or cores or modes (and consequently the number of nodes in a secondary packet ring). The data transmission system 200 can be scaled very easily.

In the data transmission system, one wavelength may be used for one ToR switch. For example, if the main optical packet ring 201 comprises 6 fibers/cores/modes and 80 wavelengths per fiber/core/mode, 480 ToR switches may be used/connected. The ToRs (i.e. the data interfaces 407) may be grouped into groups of 6 ToRs, for example, and each group, together with a corresponding EOR node 502, corresponds to a super node 500 of the main optical packet ring 201. The main optical packet ring 201 may be a synchronous optical packet ring (OPR) which is adapted to provide high bandwidth and full connectivity for data centers. Resources can be reallocated very fast (unlike with circuit switched solutions which are static or semi-static). Also, employing a synchronous optical packet ring supports fully meshed (any-to-any) traffic without requiring the traffic to go through a centralized network node as it is the case in conventional approaches.

Optical data may be carried in fixed duration slots that are time and wavelength multiplexed. A control channel may carry routing information for all synchronous timeslots on all wavelengths. Optical packets may go through a node transparently if the node is not a desired destination node. A node 400 may erase an optical data packet so that its time slot can be reused by another optical data packet. Each emitter unit (first/second transmitter units 401, 404) may be enabled to emit optical data packets at any wavelength.

The receiving units 402, 405 may be based on coherent technology and their local oscillators may be fast-tuned to any wavelength to be able to receive optical data packets on any wavelength on each timeslot. The transmitter units 401, 404 may also be fast tunable. The packet blockers 605 may selectively block any time-slot on any wavelength. In each fiber/core/mode, a dedicated wavelength (modulated for instance at 2.5 Gbit/s) may be dedicated for the control channel, or alternatively one fiber or mode or core could be dedicated to carry control data for all packets carried on all wavelengths and fibers/cores/modes (this case is shown in FIG. 3). In a super node 500, either small EDFAs 620 (Erbium Doped Fiber Amplifier) to compensate network node loss of the optical signal, or a multi-core/mode amplifier 625 may be used. Distances between the nodes are typically negligible (they are assumed to range between 1-100 meters), so the associated losses and chromatic dispersion is small (about 0). Thus, only node losses must be compensated by amplets 620. Since no chromatic dispersion has to be compensated in the receiving units 402, 405, associated hardware (e.g. a DSP (digital signal processor)) is not needed and the nodes may therefore be manufactured at lower cost and power consumption than typical coherent receiving units. The node loss is low, e.g. below 10 dB.

Each ToR may be connected to the main multi core fiber via a single mode distributed POADM ring which essentially is an optical packet ring working in a slotted fashion where data channels and a control channel are decoupled. The connection between a single mode POADM packet ring and the multi mode/core fiber packet ring is also depicted in FIG. 3. In the single mode ring, since the node loss is quite limited, it is not necessary to use optical amplifier in each ring section.

The number of wavelengths (node) may correspond to the number of fibers/cores/modes of the multi fiber/core/mode fiber. Considering the good OSNR achievable in both single and multi mode ring, coherent transmitters at 200 Gb/s may be used. In that configuration, one transmitter could collect the traffic from one ToR with 20 servers (10G) with no oversubscription. Considering a multimode fiber carrying N modes, each mode with M wavelengths (N also corresponding to the number of wavelengths in the single-mode packet ring), the number of TORs that could be connected in a full mesh manner is N×M. In the example of FIG. 2, modes with 80 wavelengths are used and 560 ToRs (i.e. 11200 servers) can be connected. For 20 modes, the situation is as follows: 1600 ToRs (32000 servers) could be connected, and for 80 modes: 6400 ToRs (128000 servers).

The architecture described above and based on a multi fiber/core/mode optical packet ring network enables to connect in a fully meshed manner hundreds or thousands of ToRs. A low oversubscription can be achieved. Easy cabling is possible even for a very large number of servers (i.e. high scalability). The architecture does not rely on hugely dense electronic hardware even for high capacity data centers.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A data transmission system comprising:
a transparent main optical packet ring comprising a plurality of separate packet transmission channels; and
a plurality of transparent secondary optical packet rings interconnected through said main optical packet ring; each of said secondary optical packet rings comprising a plurality of nodes,
wherein each of said packet transmission channels of the main optical packet ring is connected to a different node of each secondary optical packet ring, respectively; and
wherein each node comprises:
a first transmitter unit and a first receiver unit respectively connected to a packet transmission channel of the main optical packet ring,
a second transmitter unit and a second receiver unit respectively connected to one of the secondary optical packet rings,
a data interface connectable to at least one data processing unit, and
a switching unit directly connected to the first transmitter unit, the first receiver unit, the second transmitter unit, the second receiver unit and the data interface, and configured to selectively establish connection paths between the first receiver unit or the second receiver unit and the first transmitter unit or the second transmitter unit, or between one of the first receiver unit, the second receiver unit, the first transmitter unit, or the second transmitter unit and the data interface;
wherein each node comprises:
a first optical packet control interface connected to a first optical packet blocker coupled with the main optical packet ring, wherein the node is configured to forward first blocking information through the first optical packet control interface to the first optical packet blocker, the first blocking information indicating whether optical packets traveling on the main optical packet ring are to be blocked or passed through by the first optical packet blocker, and/or
a second optical packet control interface connected to a second optical packet blocker coupled with the secondary optical packet ring of the node, wherein the node is configured to forward second blocking information through the second optical packet control interface to the second optical packet blocker, the second blocking information indicating whether optical packets traveling on the secondary optical packet ring are to be blocked or passed through by the second optical packet blocker.

2. A data transmission system comprising:
a transparent main optical packet ring comprising a plurality of separate packet transmission channels; and
a plurality of transparent secondary optical packet rings interconnected through said main optical packet ring; each of said secondary optical packet rings comprising a plurality of nodes,
wherein each of said packet transmission channels of the main optical packet ring is connected to a different node of each secondary optical packet ring, respectively; and
wherein each node comprises:
a first transmitter unit and a first receiver unit respectively connected to a packet transmission channel of the main optical packet ring,
a second transmitter unit and a second receiver unit respectively connected to one of the secondary optical packet rings,
a data interface connectable to at least one data processing unit, and
a switching unit directly connected to the first transmitter unit, the first receiver unit, the second transmitter unit, the second receiver unit and the data interface, and configured to selectively establish connection paths between the first receiver unit or the second receiver unit and the first transmitter unit or the second transmitter unit, or between one of the first receiver unit, the second receiver unit, the first transmitter unit, or the second transmitter unit and the data interface;
wherein the switching unit comprises a first control information interface connected to the main optical packet ring, and wherein the switching unit is configured to receive/send control information via the first control information interface from/to the main optical packet ring, and
wherein the switching unit comprises a second control information interface connected to the secondary optical packet ring of the node, and wherein the switching unit is configured to receive/send control information via the second control information interface from/to the secondary optical packet ring, and
wherein first blocking information and second blocking information to control a first optical packet blocker coupled with the main optical packet ring and a second optical packet blocker coupled with the secondary optical packet ring are generated based on control information received via the first control information interface or via the second control information interface.

3. The data transmission system of claim 2, wherein each packet transmission channel uses a separate optical signal.

4. The data transmission system of claim 2, wherein said packet transmission channels are multiplexed transmission channels, and wherein said main optical packet ring comprises:
a demultiplexer adapted to separate the packet transmission channels of the main optical packet ring, and
a multiplexer adapted to multiplex the packet transmission channels onto the main optical packet ring.

5. The data transmission system of claim 2, wherein the packet transmission channels of said main optical packet ring comprise at least one of:

spatially multiplexed mode channels within a multi mode optical fiber to allow simultaneous propagation of signals in different optical modes, fiber cores of a multi core optical fiber, each core allowing propagation of at least one optical signal, wavelength channels within an optical fiber allowing simultaneous propagation of signals of different wavelengths, and optical fibers within a multi fiber cable, each optical fiber allowing propagation of at least one optical signal.

6. The data transmission system of claim 2, wherein each node is connected to one packet transmission channel of the main optical packet ring and one of the secondary optical packet rings.

7. The data transmission system of claim 2, wherein the switching unit comprises a first control information interface connected to the main optical packet ring, and wherein the switching unit is configured to receive/send control information via the first control information interface from/to the main optical packet ring, and wherein the switching unit comprises a second control information interface connected to the secondary optical packet ring of the node, and wherein the switching unit is configured to receive/send control information via the second control information interface from/to the secondary optical packet ring, and wherein the switching unit is configured to selectively establish connection paths between the first receiver unit or the second receiver unit and the first transmitter unit or the second transmitter unit, or between one of the first receiver unit, the second receiver unit, the first transmitter unit, or the second transmitter unit and the data interface based on control information received via the first control information interface or via the second control information interface.

8. The data transmission system of claim 2, wherein a plurality of amplifiers are placed into one of the secondary optical packet rings, which respectively amplify a signal propagating on the secondary optical packet ring, and wherein the number of amplifiers is lower than the number of nodes connected to the secondary optical packet ring.

9. The data transmission system of claim 2, wherein the nodes connected to one of the secondary optical packet rings have a common control unit coupled with the main optical packet ring, and wherein the common control unit is configured to selectively control first optical packet blockers coupled with the main optical packet ring, the first optical packet blockers selectively block or pass through optical packets traveling on the main optical packet ring.

10. The data transmission system of claim 4, further comprising:

a plurality of first optical fibers, each first optical fiber carrying one packet transmission channel of the main optical packet ring, and a plurality of amplifiers placed into the first optical fibers, which respectively amplify a signal corresponding to a packet transmission channel of the main optical packet ring.

11. A method of interconnecting network nodes in a data transmission system, the method comprising:

providing a transparent main optical packet ring comprising a plurality of separate packet transmission channels;

providing a plurality of transparent secondary optical packet rings, each of said secondary optical packet rings comprising a plurality of nodes; and interconnecting said plurality of secondary optical packet rings through said main optical packet ring by connecting each of said packet transmission channels of the main optical packet ring to a different node of each secondary optical packet ring, respectively;

wherein each node comprises:

a first transmitter unit and a first receiver unit respectively connected to a packet transmission channel of the main optical packet ring, a second transmitter unit and a second receiver unit respectively connected to one of the secondary optical packet rings, and a data interface connectable to at least one data processing unit, and a switching unit directly connected to the first transmitter unit, the first receiver unit, the second transmitter unit, the second receiver unit and the data interface, which selectively establishes connection paths between the first receiver unit or the second receiver unit and the first transmitter unit or the second transmitter unit, or between one of the first receiver unit, the second receiver unit, the first transmitter unit, or the second transmitter unit and the data interface;

wherein the method further comprising:

transmitting an optical data packet addressed to a destination node on a packet transmission channel of the main optical packet ring to a first node, wherein the destination node is not connected to the packet transmission channel carrying the data packet; and forwarding the received optical data packet from the first node via one of the secondary optical packet rings to the destination node, the secondary optical packet ring interconnecting the first node and the destination node, or transmitting an optical data packet from a source node along one of the secondary optical packet rings to a second node, the secondary optical packet ring interconnecting the source node and the second node; and forwarding the received optical data packet from the second node to its destination on a packet transmission channel of the main optical packet ring.

12. The method of claim 11, wherein control information propagates through the main optical packet ring and/or the secondary optical packet rings in synchronization with the corresponding optical data packets.

* * * * *